Oct. 11, 1932.    S. A. STRICKLAND    1,882,374
GAUGING MACHINE
Filed April 15, 1931    6 Sheets-Sheet 1

INVENTOR.
Silas A. Strickland
BY
Wolf, Hittlehales & Johnston
ATTORNEYS.

Oct. 11, 1932.  S. A. STRICKLAND  1,882,374
GAUGING MACHINE
Filed April 15, 1931   6 Sheets-Sheet 5

INVENTOR.
Silas A. Strickland
BY
Wolfe, Littlehales & Johnston
ATTORNEYS

Patented Oct. 11, 1932

1,882,374

UNITED STATES PATENT OFFICE

SILAS A. STRICKLAND, OF DETROIT, MICHIGAN, ASSIGNOR TO BOWER ROLLER BEARING COMPANY, OF DETROIT, MICHIGAN, A CORPORATION OF MICHIGAN

GAUGING MACHINE

Application filed April 15, 1931. Serial No. 530,384.

This invention relates to machines for gauging and sorting rollers according to their size. An object of the invention is to provide an improved machine for gauging rollers in such a manner that those which are of an acceptable size may be separated from the others.

Another object is to separate the rollers of acceptable size according to predetermined dimensions.

The invention consists of a gauging machine, wherein the rollers are arranged in a vertical position and then placed upon a rotating table in such a manner that they are gauged prior to sorting under the same operating conditions which exist when the rollers are operating in a bearing.

It is an object of the invention to provide a gauging machine, wherein the rollers will be gauged in a vertical position and the rolling action of the rollers as they pass the gauge members will be utilized to roll the rollers off into their proper bins.

The invention further consists of suitable mechanism, wherein a table adapted to carry a plurality of rollers is rotated past gauging members in such a manner that the rollers larger than acceptable size are first removed, then the rollers of acceptable sizes are separated into groups of predetermined dimensions and last the rollers which are under the acceptable size are removed.

The invention further consists in the gauging and sorting machine and in the parts and combination of parts hereinafter described and claimed.

In the accompanying drawings, which form a part of this specification, wherein like reference characters indicate like parts wherever they occur, Figure 3 is a sectional view on line 3—3 of Figure 1, showing details of the operating mechanism.

Figure 9 is a plan view of the gauge support, and rotating table, Figure 10 is a detailed sectional view of one form of gauging mechanism taken on line 10—10 of Figure 9, Figures 11 and 12 are end and top views, respectively, at the projecting end of the gauging element shown on Figure 10, Figure 13 is a sectional view of a portion of the gauge support taken on line 13—13 of Figure 9, Figure 14 is a perspective view of the gauging element shown on Figure 6.

The gauging machine comprises a suitable base 1 and pedestal 2 upon which is mounted a housing A containing the operating mechanism, which will hereinafter be more fully described. Supported on top of the housing A is a hopper 3 in which the rollers to be gauged and sorted are placed. In the lower portion of the hopper 3, indicated at 4 on Figure 1, suitable mechanism driven by a motor 5 is provided to arrange the rollers in a vertical position, end upon end, so that they may be fed downward through a guideway 6, chute 7 and roller feed conduit 8, to the roller feeding mechanism which is shown in detail on Figures 16 and 17, as will hereinafter be more fully described.

The housing A is formed at one side with an integral extension B which is adapted to carry in a manner to be hereinafter described a gauge support 9 provided with a plurality of radially projecting arms 10, more clearly shown in Figure 9, in which the gauge members and pin adjusting mechanism are mounted.

Figures 6, 7, 8:
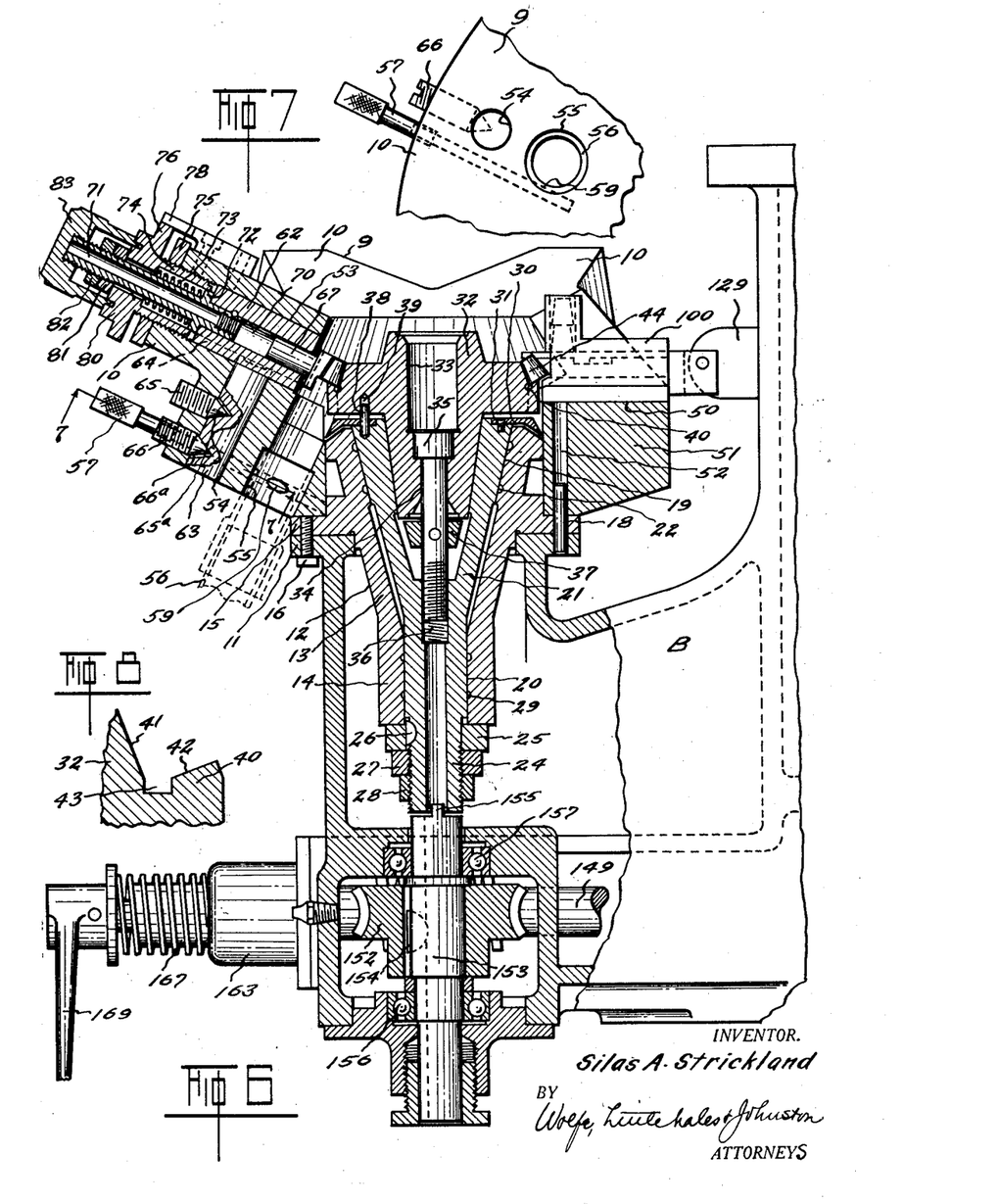
Figure 6 is a sectional elevational view of the rotating table, part of the operating mechanism therefor and one of the micrometric gauge members.
Figure 7 is a detail view taken on line 7—7 of Figure 6, showing one of the roller tube connections.
Figure 8 is an enlarged detail sectional view of one of the shoulders or roller seats on the rotating table.

The exact manner in which the rollers are gauged and sorted and the mechanism therefor may be best understood by reference to Figure 6. The extension B of the housing A is formed at the top thereof with a flange 11. Positioned within the extension B is a stationary socket member 12, comprising an upper conical portion 13 and a lower cylindrical portion 14. Formed integral with the conical portion 13 intermediate its ends is an external flange 15 adapted to seat on the flange 11 and to be rigidly secured thereto by bolts 16. To position the stationary socket member 12 in accurate alignment with its corresponding members, an upwardly projecting pin 18 is secured to the flange 11, the flange 15 of the socket member being provided with a suitable machined opening adapted to snugly fit over the pin 18. The interior of the stationary socket member 12 is provided with a conical bearing surface 19 at the upper end thereof and a cylindrical bearing surface 20 at its lower end.

Positioned within the stationary socket 12 is a rotating table 21 provided at its upper end with a conical bearing surface 22 adapted to rotate on the conical bearing surface 19, the lower portion of the rotating table 21 being provided with a cylindrical bearing surface 23 adapted to engage the bearing surface 20 of said stationary socket. The lower portion of the rotating table 21 terminates in a threaded extension 24, which carries a thrust collar 25, keyed to said extension as at 26, said thrust collar 25 abutting the lowermost end of the stationary socket. Nut 27 and lock nut 28 threaded on the extension 24, serve to hold the rotating table 21 in the stationary socket 12 in the manner readily apparent. Formed on the bearing surfaces 19 and 20 of the stationary socket 12 are lubricating grooves 29. A suitable shield or guard member 30 is secured to the top of the rotating table by means of screws 31, and is adapted to overlap the top of the stationary socket to prevent the entrance of grit and dust to the bearing surfaces.

Seated within the rotating table and engaging the top thereof is a rotating table member 32 provided centrally with a vertical opening 33 terminating at the bottom in an opening 34, of reduced diameter, said rotating table member 32 being rigidly secured to the rotating table 21 by means of a bolt 35 seated in the opening 33 and extending through the opening 34 for threaded engagement with a threaded opening 36 provided in the lower cylindrical portion of the rotating table 21. To maintain the bolt 35 in position with respect to the rotating table 32, a lock member 37 may be provided on said bolt a short distance beyond the bottom of the rotating table and secured to the bolt in any suitable manner. Proper positioning of the rotating table 32 on the rotating table 21 is accomplished by providing a pin 38 on the upper surface of the rotating table to extend above the same and adapted to seat within a suitable registering opening 39 provided in the bottom of the rotating table.

Figures 9, 10, 11, 12, 13, 14:
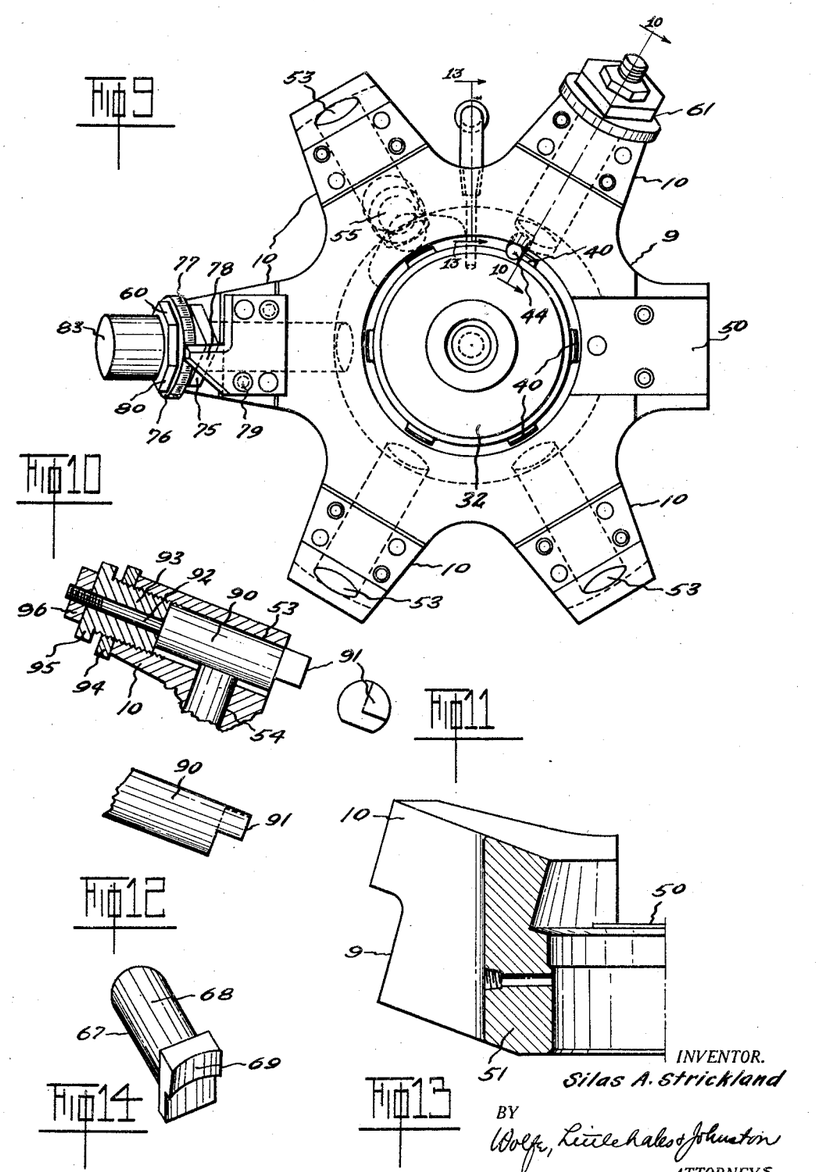
Figure 15:
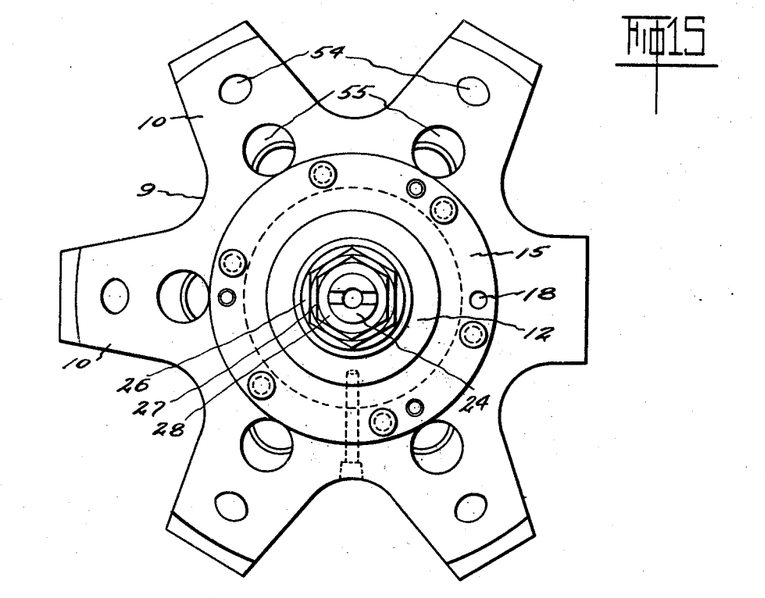
Figure 15 is a bottom plan view of the gauge support, and rotating table.

The rotating table 32 is provided at spaced points around its periphery with a plurality of projecting shoulders or seats 40 which are best shown in Figures 8 and 9. These projections cooperate with the periphery of the rotating table to form a seat for the rollers to be gauged. The seats formed by the periphery of the rotating table and the projecting shoulders are so arranged that when the rollers are placed upon the projecting shoulders they will assume the same position in which they will be placed when actually operating between the inner and outer race members of an anti-friction bearing.

This is accomplished by providing the upper peripheral surface 41 of the rotating table 32 with a conical taper, the seats 42 of the projecting shoulders being downwardly inclined, as clearly shown in Figure 8. Between the peripheral surface 41 and seat 42 of the projecting shoulders 40 are grooves 43 which function to prevent any grit or dirt interfering with the proper seating of the rollers 44, shown in Figure 6. The inclination of the peripheral surface 41, besides simulating an inner race, also functions in conjunction with the seat 42 to carry the rollers 44 in the inclined position shown in Figure 6, whereby the same may be carried by the rotating table without danger of falling off the projecting shoulders 40, the center of gravity of the rollers 44 being within the outermost edge of the shoulders 40.

Seated upon the flange 15 of the stationary socket member 12 is the gauge support 9 which, as hereinbefore stated, is provided with a plurality of radially projecting arms 10, clearly shown in Figure 9, each of said arms being downwardly inclined. Formed on the top of the gauge support 9 between certain of the arms 10 thereof is a horizontal flat channel portion 50 adapted to have seated therein a roller feeding mechanism, to be hereinafter described. Extending vertically through the annular wall portion 51 of the gauge support 9 is an opening 52 which is adapted to receive therein the projecting end of the pin 17 so as to position the gauge support on the stationary socket member 12 and to prevent the gauge support 9 from turning thereon.

Each of the arms 10 is provided with a longitudinal bore 53 which extends downwardly at an agle to the vertical axis of the rotating table. Mounted within each of said bores 53 is a gauging mechanism, to be hereinafter described. In communication with each of the bores 53 is a bore 54 extending through the body of each of the arms 10, the axes of which are perpendicular to the axes of the bores 53. In the same plane with the bores 54 are passages 55 which are parallel to the bores 54 and which extend through the annular wall portion 51 of the gauge support 9, as clearly shown in Figures 6 and 7.

Figures 1, 2:
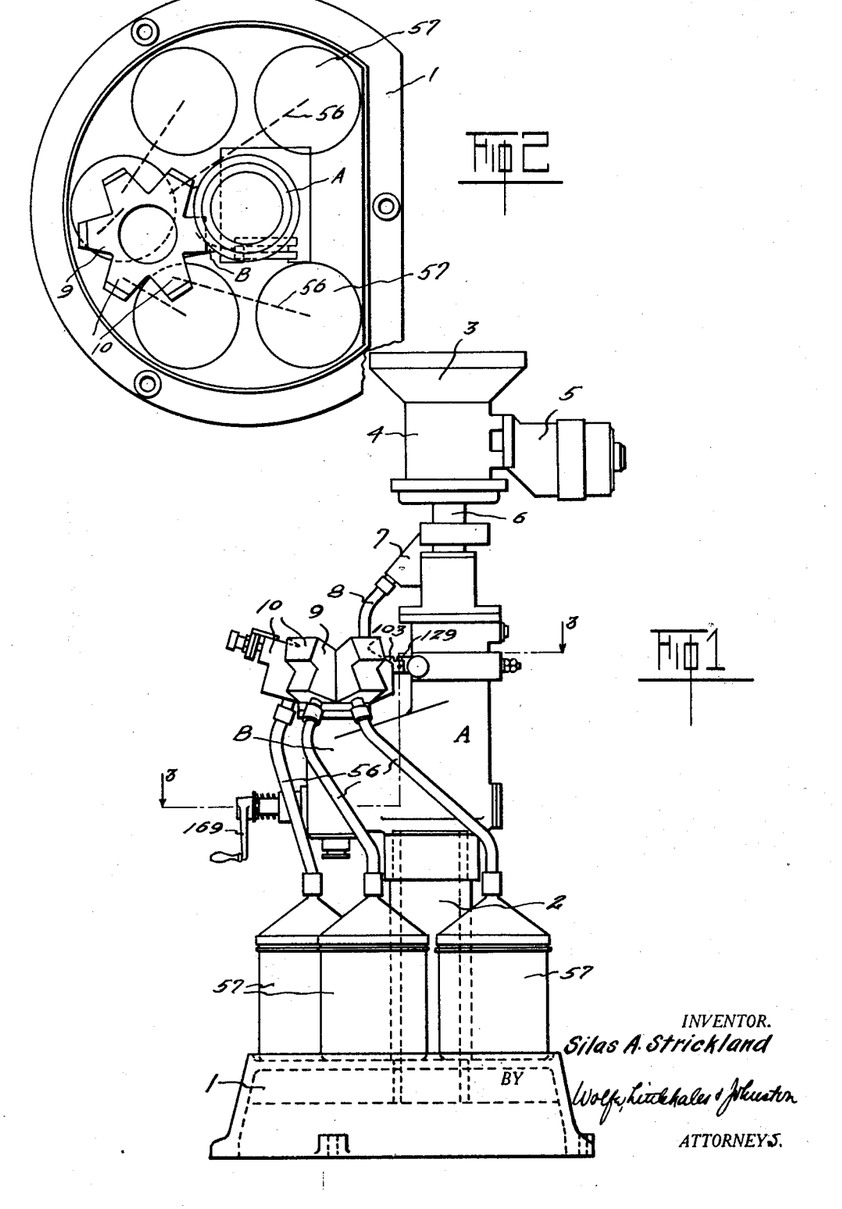
Figure 1 is an elevational view of the gauging and sorting machine.
Figure 2 is a diagrammatic plan view thereof.
Figure 2:
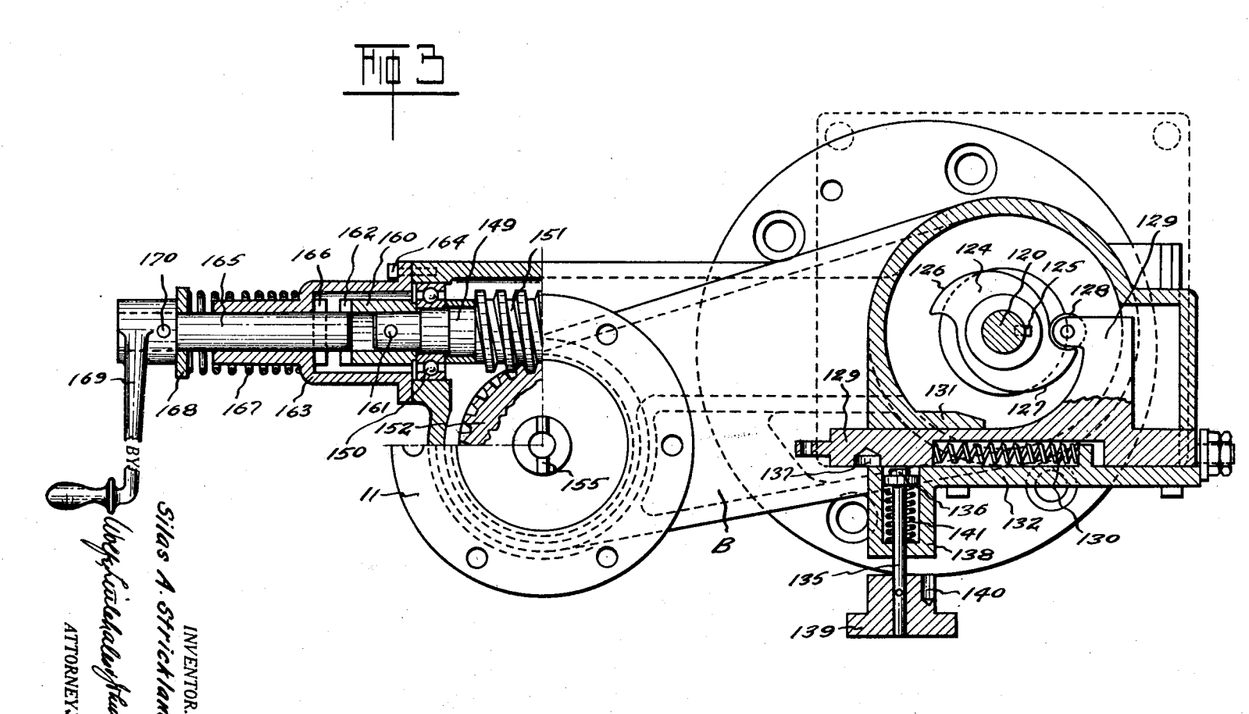

Positioned within each one of the passages 55 is one end of a conduit 56 (shown in dotted lines in Figure 6) and more clearly shown in Figure 1, the other ends of such conduits being fastened to the top of containers or bins 57 in any desired manner. Each of said bins is adapted to receive rollers of the same size as selected by the gauges, in the manner to be hereinafter described. The ends of the conduits 56 are removably secured in the passages 55 by a locking pin 57 which is inserted in an opening 58 in each of the arms 10, which openings extend beyond the passages and are tangent to the walls thereof.

A groove or notch 59 is provided on each of the conduits 56 to register with the opening 58 so as to cooperate with the locking pin 57, when in place, to lock the conduit in position. Thus, it will be seen that when it is desired to remove one of the conduits 56 for any purpose, the locking pin 57 may be withdrawn and the end of the conduit 56 slipped out of the passage 55.

The gauge members may be of two different forms. They may be provided with a micrometric adjustment, as shown at 60 in Figure 9 or they may be provided with a lock nut adjustment, as shown at 61 in Figure 9. The two different forms of gauge members may be used for the same purpose and they may be set by means of the micrometric adjustment shown at 60 or by means of a suitable master gauge.

Mounted within one of the bores in one of the arms 10, such as 53ª, is a bearing sleeve member 62 which is held in accurate position by means of a cylindrical member 63, fitting within the bore 54 and adapted to seat in a groove 64 provided in the bearing sleeve member 62, the position of which is accurately determined by means of tapered end adjustment screws 65 and 66 which are threaded in the rear of the arm 10, the ends thereof being seated in offset conical openings 65ª and 65ᵇ provided in the cylindrical locking member 63.

Frictionally held within the bearing sleeve member 62 is a roller gauge member 67 which moves as a unit with the bearing sleeve for adjustment in any desired position. The roller gauge member 67 will be best understood by reference to Figure 14, and comprises a bearing shank portion 68 having at one end a roller engaging surface 69. The roller engaging surface 69 is formed so that it is of the same dimensions as a portion of the outer race surface of a bearing in which the roller is to operate. Thus, it will be seen that as the rotating table 32 carries the rollers past the gauging members 67, the rollers will roll between the seats on the rotating table and the surface 69 of the gauge member 67 in exactly the same manner as if they were operating between the inner and outer races of the bearing.

In order accurately to adjust the position of the gauge member 67 a spring 73 is provided in abutment with a shoulder 72 on the hollow plunger 71, the plunger, in turn, being locked to the slidable bearing 62 which carries the gauge member. At its opposite end the spring 73 is compressed by the adjusting screw 74, the inner end of which is normally out of contact with bearing 62. Thus, by adjusting the micrometer screw inwardly and thereby increasing the compression of spring 73 the plunger 71, and consequently the bearing 62 and the gauge element are moved inwardly to advance the gauge toward the roller seats of the rotatable table.

The bore of the plunger may be threaded as shown for receiving an ejector pin used in the removal of the gauge element. Such tool forms no part of the present invention, however, and for that reason is not shown. A lock nut 75 on the threaded part of the housing member 74 serves to lock the same in its adjusted position to the arm 10. Formed integrally with the housing member 74 is an enlarged flange portion 76, the periphery of which is calibrated with a scale 77, see figure 9, which cooperates with an index or pointer 78 secured to the top of the arm 10 by means of screws 79. To effect adjustment of the housing member 74, the outer portion of the flange 76 is formed with an integral polygonal head 80. The hollow plunger member at its outermost end is threaded and is provided with an adjusting nut 81 engaging the end of the housing member 74, and a lock nut 82. To protect the end of the plunger member 71 and its adjusting nuts a cap member 83 is secured to the end thereof and adapted to move therewith.

The gauge member is initially adjusted to a desired clearance between the end of the housing 74 and the end of a bearing sleeve 62, (approximately .15 to .020 clearance) by means of nut 81 and lock nut 82. The spring 73 will maintain the plunger 71 which is movable with the gauging element in contact with the micrometer screw or housing. Thus, when the gauge is approximately set by adjustment or screw 81, and accurately by the micrometer screw, such adjustment may be maintained by lock nut 75. Because of the slight clearance between housing 74 and the bearing 62, the gauge will not be mutilated or broken in the event a roller of too large diameter passes the station, for in such case the spring 73 will give and permit the gauging element to recede but after passage of the roller beyond the station, the gauging element will return to its set position.

The modified form of gauge mechanism which is shown at 61 in Figure 9 comprises a gauge member 90 which is formed at one end with a gauging surface 91. At its other end and integral therewith is a threaded extension 92 of reduced diameter. Abutting the gauge member 90 and surrounding the extension 92 is a threaded sleeve 93 which is adjustable within the bore 53 and may be locked in any desired position by means of a lock nut 94 mounted thereon, which secures the gauge member 90 to the sleeve 93. The end of the threaded sleeve 93 is provided with an hexagonal head 95 to operate the same in order to effect adjustment of the gauge member 9. A lock nut 96 serves to clamp the threaded sleeve 93 securely to the gauge member 90.

Figures 16, 17:
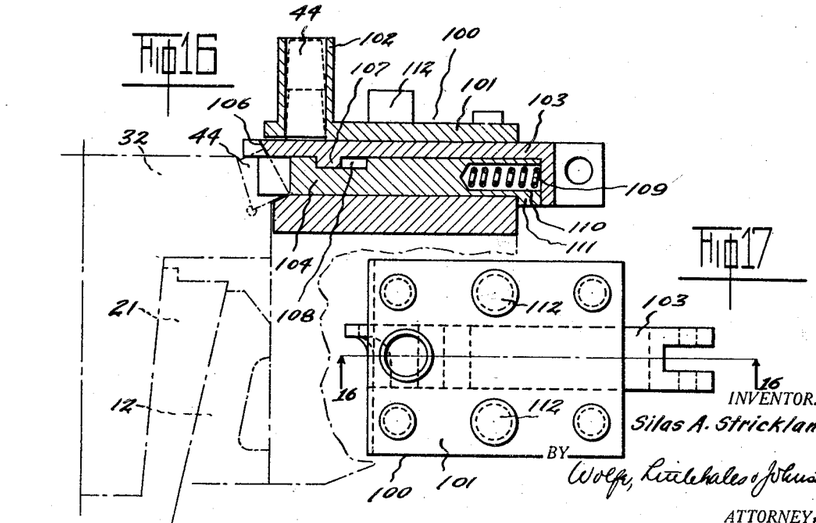
Figure 16 is a detailed sectional view of the roller feeding mechanism taken on line 16—16 of Figure 17.
Figure 17 is a plan view of the roller feeding mechanism and the housing therefor.

The rollers are fed on the shoulders 40 formed upon the rotating table 32 by means of a roller feeding mechanism 100 which is best shown in Figures 16, 17. This structure comprises a housing 101 which has a neck 102 at one end. This neck 102 connects with the guideway 6, chute 7, and roller feed conduit 8 (Figure 1) by which the rollers are fed from the hopper 2. Slidable within the housing 101 is the roller feeding mechanism which consists of the horizontal reciprocating members 103, 104. The reciprocating roller feed member 103 is formed at one end with a forked projection adapted to be connected to the roller feed operating mechanism to be hereinafter described, the other end thereof being formed with an inclined surface 106. Directly under the member 103, and movable relative thereto, is the member 104. The movement of the member 103 relative to the member 104 is determined by means of the depending lug or projection 107 on the member 103 which operates in the groove 108 formed in the member 104. A compression spring 109 seated within an opening 110 in the member 104 acts against the member 103, tending to separate the same from the member 104. A stop or shoulder 111 on the member 104 engages the housing 101 to limit the inward movement of said member, and is maintained in its position, shown in Figure 16, by the coil spring 109, except when it is moved in an outward direction by means of the lug 107.

The roller feeding mechanism 100 is adapted to be positioned in the channel portion 50 of the gauge support 9 and to be rigidly secured thereto by means of the bolts 112.

Figures 4, 5:
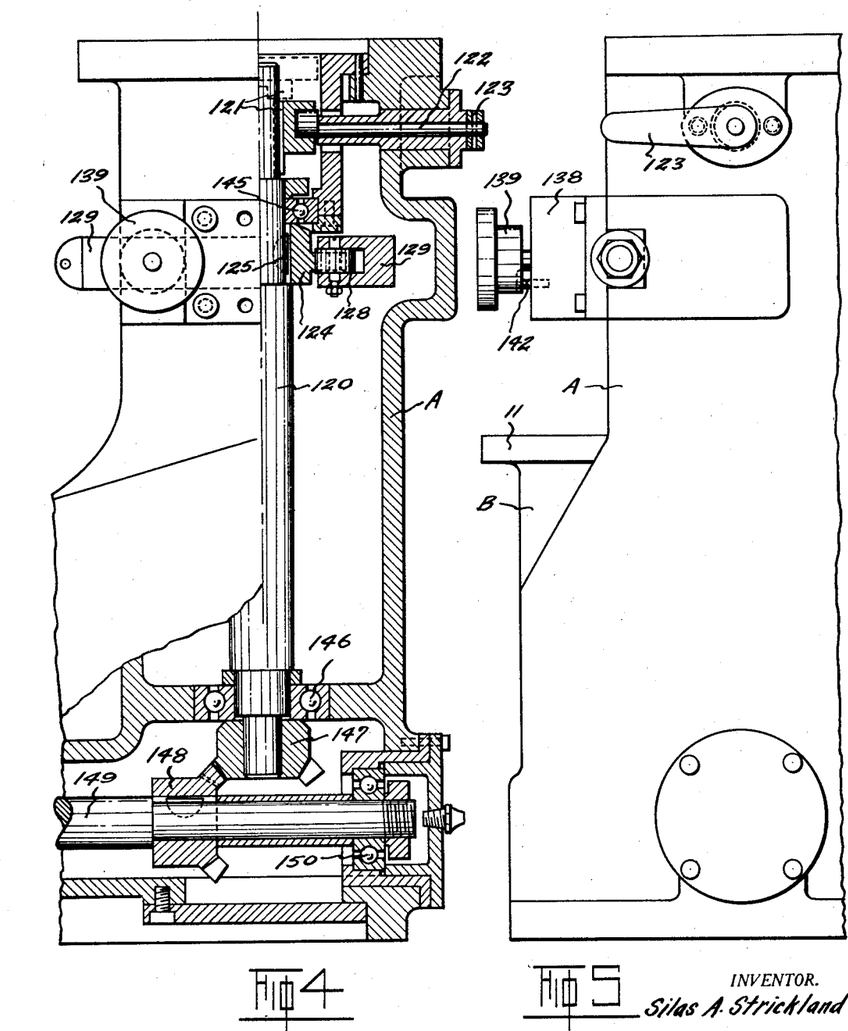
Figure 4 is an elevational view, partly in section, of the drive for the feeding mechanism and the rotating table, housed in the part A of the machine, Figure 1.
Figure 5 is a side elevational view of the part of the machine housing indicated by the letter A in Figure 1.

The driving means for the roller feeding mechanism and rotating table is shown in Figures 3, 4. The shaft 120 is driven by any suitable means through a clutch generally indicated at 121, and is operated by means of the rod 122 and lever 123. It forms no part of the present invention and may be of any suitable design. Near the upper end of the shaft 120 a cam member 124 is keyed thereto by means of the key 125. This cam member is provided with two cam surfaces 126, 127 which cooperate with the cam roller 128 carried by the forked reciprocating actuating member 129. Thus, it will be seen that as the shaft 120 rotates the cam roller 128 will ride upon the cam surfaces 126, 127 and thus impart the necessary reciprocating motion to the reciprocating member 129. A spring 130 may be provided in a suitable slot 131 formed in the reciprocating member 129 to cause the cam roller 128 to follow the cam surfaces of the cam member 124, in the manner readily apparent.

The reciprocating actuating member 129 is supported by suitable guides 131 and 132, constituting a part of the housing A, the end of said reciprocating actuating member extending beyond said housing and adapted to be connected to the forked end 105 of the reciprocating roller feed member 103, as clearly shown in Figure 1.

Means are provided to lock the roller feed operating mechanism in such a position that no rollers will be fed onto the rotating table 32. Said means comprises a rod 135 having a locking lug 136 adapted to enter a recess 137 formed in the reciprocating actuating member 129, said rod being positioned in a cylindrical guide 138 comprising part of the housing A and extending therefrom so as to have attached thereto a knob 139 provided with a hole 140. Urging the rod 135 inwardly is a coil spring 141 positioned in the guide 138 and acting against the locking lug 136 in the manner shown. A pin 142 is secured to the guide 138 the end thereof abutting the inner surface of the knob 139. Thus, it will be seen that when it is desired to place the locking lug 136 in the recess 137 it is only necessary to turn the knob 139 which is keyed to the rod 135 until the pin 142 and hole 140 register, whereupon the spring 141 bearing against the locking lug 136 will cause the same to enter the recess 137 when said recess is brought into alignment with the locking lug 136 to lock the roller feed operating mechanism.

The shaft 120 may be supported in bearings 145 and 146 of any suitable design. At its lower end a bevel gear 147 is provided which, in cooperation with the bevel gear 148, transmits rotation to a cross shaft 149 supported on bearings 150. The other end of the cross shaft 149 is provided with a worm gear 151 which meshes with a worm wheel 152 keyed to an upright shaft 153 (Figure 6) by means of a key 154. The upright shaft 153 is provided with a suitable connection 155, which cooperates with the end of the rotating table 12, whereby rotation is imparted to the rotating table 12, and to the rotating table 32 carried thereby. The cross shaft 149 and the upright shaft 153 may be supported in any suitable bearings 156 and 157. The speed of rotation of the roller carrying table is not sufficient to cause unseating of the rollers due to centrifugal force.

It may be desirable to operate the gauging machine slowly by hand in order to make necessary adjustments of the gauge members and other parts. Figure 3 shows mechanism whereby this may be carried out. The cross shaft 149 extends beyond the worm gear 152 and is provided at its end with a sleeve 160 keyed thereto by means of a pin 161. This sleeve is provided at one end with a slot 162. Carried by the end of the housing section B is a supporting casing 163 secured thereto by bolts 164, said casing enclosing the sleeve 160 and cross shaft 149. Rotatably mounted in the supporting casing 163 is a rod member 165 provided with a cross key 166 which is normally held out of engagement with the sleeve 160 by means of a spring 167 surrounding the casing 163 and abutting the collar 168. The end of the rod 165 may be provided with a suitable handle 169, keyed thereto as at 170, the collar 168 engaging the handle 169 on the rod 165. Thus, it will be seen that when it is desired to operate the machine by hand it is only necessary to push the rod 165 in until the key 166 meshes with the slot 162 in the sleeve 160 and rotate the handle 169 in either direction, as desired.

The operation of the device is as follows:

Rollers are fed into the hopper 3 where, by a suitable mechanism, they are arranged end upon end in a vertical position with their large ends downward and are fed downward through conduits 6, 7 and 8 to the neck 102 of the roller feeding mechanism 100. The roller feeding reciprocating members 103 and 104 then move to the right under the action of the reciprocating actuating member 129 and allow the rollers 44 to drop down into position, after which the roller feeding members move to the left until the reciprocating member 104 is stopped by engagement with the frame, but the upper reciprocating member 103, due to the slot 108, continues to move to the left and thus tips the roller 44 over and places it in the proper position upon the seat 40, which is shown in detail in Figure 8, upon the rotating table 32 attached to the rotating table 21. The table then rotates until it reaches the first gauging station, which is set so as to remove all the rollers which are larger than an acceptable size. It may be desirable that this particular station consist of the gauging mechanism incorporating the spring, as shown in Figure 6, so that if the roller 44 should be unusually large or should for any reason become jammed the gauging member 67 can move back against the spring 73 without any injury to the apparatus. If the roller 44 is larger than the measurement for which the gauge 67 is set, it will be rolled off and dropped down through the passage 55 and conduit 56 into a bin or container 57. The rotating table 32 continues to rotate, and rollers 44 which are of the acceptable size pass by the first gauging station to the next several gauging stations, where the rollers 44 of acceptable size are assorted according to predetermined dimensions. Any rollers which are below the acceptable size will pass on to the last gauging station, whence they will be rolled off and passed down to a suitable container 57 in the same manner as the other rollers. Any particular seat 40 on the rotating table 32 is now free to rotate to the roller feeding mechanism 100 and to receive another roller, the actuating mechanism and drive for the roller feed mechanism 100 and rotating table 32, respectively, being so corelated that a seat 40 on the rotating table will present itself in proper position relative to the roller feed mechanism 10, at the proper position of the cycle of operation of the reciprocating parts of the roller feed mechanism to place a roller 44 on the seat 40.

The above described gauging and sorting machine is simple in construction and operation and is very economical and accurate. Obviously, numerous changes might be made without departing from the invention, and I do not wish to be limited to the precise construction shown.

What I claim is:

1. In a roller gauging machine, a gauge support, a rotating table, spaced seats on said rotating table, each adapted to carry a roller to be gauged, and a gauge member having an extended surface substantially coaxial with said rotating table adapted selectively to engage a roller and roll it off its seat during rotation of said table.

2. In a roller gauging machine, a housing, a gauge support rigidly secured thereto, a rotating table operable within said gauge support and extending into said housing, means removably secured to said rotating table and providing spaced seats, each adapted to carry a roller to be gauged, and a gauge member having an extended surface substantially coaxial with said rotating table adapted selectively to engage a roller and roll it off its seat during rotation of said table.

3. In a roller gauging machine, a gauge support, a rotating table, spaced seats on said rotating table, each carrying a roller to be gauged, and a gauge member having an extended surface substantially coaxial with said rotating table adapted selectively to engage a roller and roll it off its seat during rotation of said table, and a chute below each gauge member for receiving rollers selected by each such gauge.

4. In a roller gauging machine, a housing, an annular gauge support having a plurality of radially extending arms rigidly connected to said housing, a rotating table operable within said gauge support and extending into said housing, means removably secured to said rotating table and providing spaced seats, each adapted to carry a roller to be gauged, and a gauge member having an extended surface substantially coaxial with said rotating table adapted selectively to engage a roller and roll it off its seat during rotation of said table.

5. In a roller gauging machine, a gauge support, a rotating table mounted adjacent said gauge support and having radial roller receiving seats adapted to sustain rollers to be gauged, the peripheral surface of said table adjacent the respective roller seats being so inclined relative thereto that each roller is received with its side surface in contact with the peripheral surface of said table and is adapted to roll thereon about the axis of the table, one or more gauges carried by said gauge support and a discharge chute adjacent each gauge, whereby when a roller of selected dimension is presented to the gauge which has been set for rollers of that size, it is rolled between the face of the gauge and the peripheral shoulder of the table, and thereby is removed from its seat and deposited in the discharge chute.

6. In a roller gauging machine a housing, a gauge support attached thereto, roller carrying means rotatable with respect to said gauge support, spaced roller carrying seats projecting radially therefrom to support individual rollers in inclined position and so present them successively to be sorted, a plurality of arms extending outwardly from said gauge support, a gauge carried by each of said arms, a gauging element in each of said gauges, adjusting means on said gauges permitting a fixed predetermined positioning of the gauging element relative to the roller carrying means whereby rollers of a predetermined size will be engaged by said gauging element in rolling contact therewith and rolled from their seats, certain of said gauges comprising resilient means permitting yielding of the gauging element.

7. In a roller gauging machine, a housing, a gauge support attached thereto, roller carrying means on said gauge support, spaced roller carrying seats projecting radially therefrom to support rollers in inclined position and so present them successively to be sorted, a plurality of spaced arms extending outwardly from said gauge support, a gauge carried by each of said arms, a gauging element in each of said gauges, adjusting means on said gauges permitting a fixed predetermined positioning of the gauging element relative to the roller carrying means, whereby rollers of a predetermined size will be engaged by said gauging element in rolling contact therewith and rolled from their seats, and means on certain of said gauges combined with the adjusting means therein for effecting a micrometric adjustment of the gauging element, said certain of the gauges including resilient means permitting a yielding movement of the gauging element carried thereby.

8. In a roller gauging machine, a housing, a vertical socket member secured to said housing and extending within the same, a rotating table in said socket member, provided with a threaded extension, thrust and locking means on said extension, a roller carrier fitting within said rotating table and removably secured thereto, said rotating table being provided on its periphery with a plurality of spaced roller carrying seats, and an annular gauge support surrounding said rotating table and roller carrying member and seated on said socket member, means on said housing for centering said gauge support on said socket, and centering means on said rotating table for centering the roller carrying member thereon.

9. The structure specified in claim 8, wherein the upper peripheral portions of the roller carrying member directly above the roller carrying seats formed thereon, is provided with a tapered surface adapted to coact with the surface of the rollers carried by said seats in such manner, whereby said rollers will be gauged in the position they would assume when functioning between the inner and outer raceway of a bearing.

10. The structure specified in claim 8, wherein the upper peripheral portion of the roller carrying member directly above the roller carrying seats formed therein is provided with a tapered surface adapted to coact with the end surface of the rollers carried by said seats in such a manner, whereby the rollers will be maintained in an inclined position.

11. In a roller gauging machine, a gauge support comprising a plurality of radially extending arms, longitudinal bores in each of said arms, gauging means positioned in each of said bores, one of said gauging means comprising a bearing sleeve wholly within said bore, a threaded housing adjustably fitting within the outer end of said bore, a plunger extending through and slidable within said housing and positioned partly within said bearing sleeve, a fixed abutment on said plunger, spring means in said housing between said housing and said abutment on the plunger, locking means on said threaded housing to lock the same in position, a flange provided with a micrometric scale integral with the outer portion of said threaded housing, and an index rigidly secured to the top of the arm housing the gauging means, and in cooperative engagement with said scale, an adjustable abutment on said plunger adjacent the outer end thereof maintained in engagement with the flange of said threaded housing by said spring, and a cap secured to said plunger end and completely enclosing the adjustable abutment thereon.

12. The structure specified in claim 11 and an adjustable retaining means for said one of said gauging elements comprising a bore in said radial arm perpendicular to the radial bore therein, a pin in said bore seated in a groove formed on the bottom of said bearing sleeve and tapered screw means carried by said arms for adjusting said pin relative to said bearing sleeve.

13. In a roller gauging machine, a gauge support comprising a plurality of longitudinal extending arms, radial bores in each of said arms, gauging means positioned in each of said bores, certain of said gauging means comprising a threaded adjusting member fitted in the outer end of said bore and provided with a central opening, a gauging element on said bore provided with an extension of reduced diameter adapted to extend through the opening in said threaded member, means on said gauging element extension for locking the same to said adjusting member, and an adjustable positioning means for said certain of said gauging elements comprising a pin in said radial arm perpendicular to said gauging element and seated in a groove formed therein, and screw means carried by said arm for adjusting the position of said pin.

14. In a roller gauging machine, a housing, a gauge support thereon, a plurality of gauges on said gauge support, roller carrying means including spaced platforms for sustaining individual rollers on end during a gauging operation, a plurality of passages in said gauge support, the axes thereof being in alignment with the axes of the rollers when positioned on the roller carrying platforms and presented to said gauges, a conduit connecting each passage with a separate bin mounted on the bed of the machine for conducting rollers selected or discarded by said gauges thereinto, and pin means positioned on said gauge support for removably locking the conduit in said passage.

15. In a roller gauging machine, a housing, a plurality of gauges mounted on a suitable support positioned on said housing, a roller carrying structure supported by said housing including a rotating table, power driven means for driving the same comprising a motor drive, a vertical shaft in said housing, clutch means on said shaft connecting the same to said motor drive, a cross shaft in said housing, gear means operatively connecting said shafts, a stub shaft in driving engagement with said rotating table and gear means operatively connecting said cross and stub shafts.

16. In a roller gauging machine, a housing, a gauge support positioned thereon, a rotor table including a roller carrier operable within said gauge support, driving means in said housing for operating said rotor table, a roller feed mechanism comprising a roller feed housing secured to said gauge support, means for supplying rollers to said roller feed housing, reciprocating members in said roller feed housing for placing the rollers on said roller carrier in inclined position thereon, a reciprocating actuating member mounted on suitable guides in said housing and extending therefrom to be secured to one of said reciprocating members, a cam follower on said actuating member, cam means on said driving means engaging said cam follower for imparting an inward movement to said actuating member and spring means cooperating with said actuating member and housing for causing said cam follower to engage the cam at all times and to move the actuating member outwardly.

17. The structure specified in claim 16, including means for locking the actuating member to cut out the roller feed mechanism and manual means for operating the rotor table, including a crank supported by the housing and means normally out of engagement with the rotor table drive adapted to engage the same for manually operating the rotor table.

In testimony whereof I affix my signature.

SILAS A. STRICKLAND.